(12) United States Patent
Lee et al.

(10) Patent No.: US 9,562,189 B2
(45) Date of Patent: Feb. 7, 2017

(54) METHOD FOR PREPARING PHOTOLUMINESCENT CARBON NANODOTS

(71) Applicant: KOREA BASIC SCIENCE INSTITUTE, Daejeon (KR)

(72) Inventors: Hyun-Uk Lee, Cheongju-si (KR); Jou-Hahn Lee, Daejeon (KR); Eun-Sik Park, Busan (KR)

(73) Assignee: KOREA BASIC SCIENCE INSTITUTE, Yuseong-gu, Daejeon (KR)

( * ) Notice: Subject to any disclaimer, the term of this patent is extended or adjusted under 35 U.S.C. 154(b) by 7 days.

(21) Appl. No.: 14/761,579

(22) PCT Filed: Jan. 15, 2014

(86) PCT No.: PCT/KR2014/000415
§ 371 (c)(1),
(2) Date: Jul. 16, 2015

(87) PCT Pub. No.: WO2014/112775
PCT Pub. Date: Jul. 24, 2014

(65) Prior Publication Data
US 2015/0361338 A1     Dec. 17, 2015

(30) Foreign Application Priority Data
Jan. 18, 2013 (KR) .................. 10-2013-0006057

(51) Int. Cl.
C09K 11/65 (2006.01)
C01B 31/02 (2006.01)

(52) U.S. Cl.
CPC ........... *C09K 11/65* (2013.01); *C01B 31/0206* (2013.01)

(58) Field of Classification Search
CPC ............. C01B 2202/22; C01B 2202/24; C01B 2202/26; C01B 2202/28; C01B 2202/30; C01B 2202/32; C01B 2202/34; C01B 2202/36; B82Y 5/00; B82Y 10/00; B82Y 15/00; B82Y 20/00; B82Y 25/00; B82Y 30/00; B82Y 35/00; B82Y 40/00; B82Y 99/00
USPC .............................................. 423/448, 445 R
See application file for complete search history.

(56) References Cited

FOREIGN PATENT DOCUMENTS

KR     10-2007-0059066        6/2007

OTHER PUBLICATIONS

Hsu, et al., Supporting Information Synthesis and Analytical Applications of Photoluminescent Carbon Nanodots, accessed online at http://www.rsc.org/suppdata/gc/c2/c2gc16451e/c2gc16451e.pdf on Sep. 6, 2016.*

(Continued)

*Primary Examiner* — Daniel C McCracken
(74) *Attorney, Agent, or Firm* — Lewis Roca Rothgerber Christie LLP (57) ABSTRACT

A method for preparing photoluminescent carbon nanodots includes preparing and drying a sample, ashing the sample, extracting the ashed sample with solvent, filtering the extracted sample, concentrating the filtered sample, dissolving the sample in water, and freeze-drying the dissolved sample. The sample is preferably a food waste residue or animal excrement.

9 Claims, 5 Drawing Sheets

(56) References Cited

OTHER PUBLICATIONS

Zhu, et al., Electronic Supplementary Information (ESI) Bifunctional fluorescent carbon nanodots: green synthesis via soy milk and as metal-free electrocatalysts for oxygen reduction, accessed online at http://www.rsc.org/suppdata/cc/c2/c2cc33844k/c2cc33844k.pdf on Sep. 19, 2016.*
International Search Report of corresponding PCT/KR2014/000415, dated Feb. 28, 2014, 4 pages.
Hsu, et al., "Synthesis and Analytical Applications of Photoluminescent Carbon Nanodots," Green Chemistry, 2012, vol. 14, pp. 917-920.
Baker, et al., "Luminescent Carbon Nanodots: Emergent Nanolights," Angew. Chem. Int. Ed. 2010, vol. 49, pp. 6732-6744.
Zhu, et al., "Bifunctional Fluorescent Carbon Nanodots: Green Synthesis via Soy Milk and Application as Metal-Free Electrocatalysts for Oxygen Reduction," Chem. Commun., 2012, vol. 48, pp. 9367-9369.
Li, et al., "Carbon Nanodots: Synthesis, Properties and Applications," J. Mater. Chem., 2012, vol. 22, pp. 24230-24253.

\* cited by examiner

FIG. 5

METHOD FOR PREPARING PHOTOLUMINESCENT CARBON NANODOTS

CROSS-REFERENCE TO RELATED APPLICATION(S)

This application is a National Phase Patent Application and claims priority to and the benefit of International Application Number PCT/KR2014/000415, filed on Jan. 15, 2014, which claims priority to Korean Patent Application Number 10-2013-0006057, filed on Jan. 18, 2013, the entire contents of all of which are incorporated herein by reference.

TECHNICAL FIELD

The present invention relates to a method for preparing photoluminescent carbon nanodots, and more particularly to a method for preparing photoluminescent carbon nanodots using a food waste residue or animal excrement.

BACKGROUND ART

A photoluminescent nano-material, which is typically referred to as nanodots, refers to a material having a nanometer particle size to represent a specific light emission phenomenon. Photoluminescent nano-materials have been used for sensing, imaging, or solar cells according to inherent characteristics thereof. In particular, the photoluminescent nano-material is greatly expected in cell imaging, and the use value of the photoluminescent nano-material will be more increased in the future.

Photoluminescent nano-materials formed of CdS or CdSe, which have recently extensively used, may cause many problems in the use for the biological purpose, especially medical purpose due to the inherent heavy metal toxicity thereof.

On the one hand, although silicon (Si)-semiconductor quantum dots represent safety characteristics against the toxicity in the use for the biological purpose, especially medical purpose, the Si-semiconductor quantum dots do not represent excellent light emission stability.

Gold (Au)-nanodots or silver (Ag)-nanoclusters may have an economical problem in relation to the preparation cost.

In other words, there is a demand for a photoluminescent nano-material economically advantageous with safety in the biological use and stability in long-term light emission.

In addition, although carbon nanodots (C-DOT) represents a Φ value (measurement value of a photoluminescence emission spectrum) lower than that of a photoluminescent nanodots, the C-DOTs have been spotlighted in terms of chemical, optical, and biological safety.

However, conventionally, in order to obtain the carbon nanodots, a solvent, such as poly ethylene glycol (PEG), or strong acid is required, or a laser ablation scheme under high-temperature and high-pressure inert gas is required.

Therefore, it is necessary to more economically or more simply prepare the photoluminescent carbon nanodots.

Meanwhile, as a related art of the method for preparing the photoluminescent carbon nanodots according to an exemplary embodiment of the present invention, there is a coated water soluble nanoparticle disclosed in Korean Unexamined Patent Publication No. 10-2007-0059066 (published on Jun. 11, 2007).

DISCLOSURE

Technical Problem

An object of the present invention is to provide a method for preparing photoluminescent carbon nanodots, capable of representing biological safety and excellent light emission stability, and having an economic advantage.

The above and other objects, features and other advantages of the present invention will be more clearly understood from the following detailed description.

Technical Solution

In order to accomplish the above object, there is provided a method for preparing photoluminescent carbon nanodots. The method includes preparing and drying a sample, ashing the sample, stirring the ashed sample while extracting the ashed sample from a solvent, filtering the extracted sample, concentrating the filtered sample, dissolving the sample in water, and freeze-drying the dissolved sample.

Preferably, the sample is a food waste residue or animal excrement.

In this case, the drying of the sample may be performed by sunlight.

In addition, the ashing of the sample is preferably performed at a temperature in a range of 300° C. to 600° C. for three hours, performed through the treatment of a 50 W or more microwave for 45 hours to two hours, or performed through the treatment of 5 W or more ultrasound irradiation for 45 hours or three hours. The stirring is preferably performed for 10 min. to 30 min.

Further, the filtering of the sample may be performed through vacuum filtration using a filter paper.

Preferably, the method further includes performing a filtering operation using a membrane filter after the vacuum filtration.

In this case, the membrane filter may have a pore size of 0.22 μm

In addition, the solvent is most preferably one of water, alcohol, ethanol, and ether.

The details of other embodiments will be understood with reference to the following detailed description and accompanying drawings.

The advantages, the features, and schemes of achieving the advantages and features of the disclosure will be apparently comprehended by those skilled in the art based on the embodiments, which are detailed later in detail, together with accompanying drawings. However, the disclosure is not limited the embodiments disclosed below, but can be realized in various forms. The present embodiments are provided to make the disclosure perfect and to make those skilled in the art completely understand the technical field of the disclosure. The disclosure is defined only accompanying claims.

Throughout the specification, the same reference number will be assigned to the same elements. The size, the position, and the coupling relation of each component may be exaggerated, omitted, or schematically drawn for the purpose of convenience or clarity. In addition, the size of elements does not utterly reflect an actual size.

Advantageous Effects

As described above, according to the exemplary embodiment of the present invention, the photoluminescent carbon nanodots, which represents biological safety and excellent light emission stability, and has an economical advantage, can be provided.

DESCRIPTION OF DRAWINGS

FIGS. 2(a) and (b) are photographs showing an actual fluorescence experimental result of the filtrate of the photoluminescent carbon nanodots according to the exemplary embodiment of the present invention in which

BEST MODE

Mode for Invention

Hereinafter, the embodiments according to the present invention will be described in detail with reference to accompanying drawings.

Recently, food waste residues have been separately collected due to the aftereffect of the green movement. However, since a great amount of food waste residues are collected, the disposal of the food waste resides may be difficult. It is noted that the food waste residue, which is difficult in disposal, is used as a source material in a method for preparing photoluminescent carbon nanodots according to the exemplary embodiment of the present invention.

Meanwhile, it is noted that the method for preparing the photoluminescent carbon nanodots according to the exemplary embodiment of the present invention can employ microalgae, livestock excrement, residues after oil extraction, coffee residues, wood, and plants as well as the food waste residues as the source material.

Figure 1:
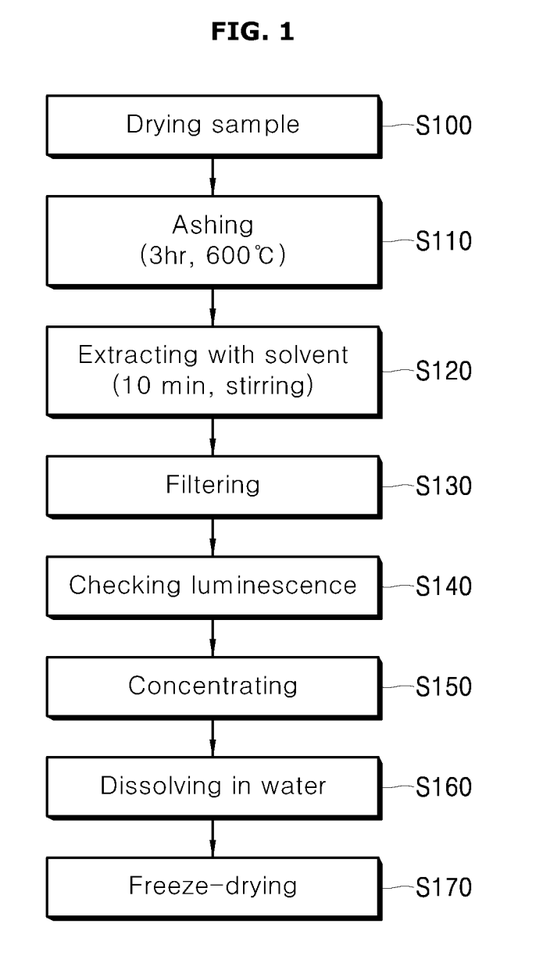
FIG. 1 is a flowchart schematically showing a method for preparing the photoluminescent carbon nanodots according to an exemplary embodiment of the present invention.

FIG. 1 is a flowchart schematically showing the method for preparing the photoluminescent carbon nanodots according to the exemplary embodiment of the present invention.

Referring to FIG. 1, the method for preparing the photoluminescent carbon nanodots according to the exemplary embodiment of the present invention includes a sample drying step (S100), an ashing step (S110), a step (S120) of extracting the sample from a solvent, a filtering step (S130), a luminescence checking step (S140), a concentration step (S150), a step (S160) of dissolving the sample in water, and a step (S170) of freeze-drying the sample.

Sample Drying

The sample drying step (S100) is a pre-treatment step for the food waste residue.

Since a great amount of moisture exists in the food waste residue, the moisture accelerates the corruption and causes a bad smell. According to the exemplary embodiment of the present invention, the food waste residue is first dried since the moisture participates in various reactions.

In detail, the food waste residue is dried until the moisture content of 80% in the initial stage becomes the moisture content of 1% in the final stage.

In order to save the cost of drying, natural drying by sunlight is preferable. In addition, those skilled in the art can understand that the drying through heating is possible.

In this case, after the drying has been finished, the dried sample may be ground using a grinder so that the sample can be easily treated in the subsequent step. In detail, the sample may be sufficiently ground using a grinder that is commercially available.

Ashing

The ashing step (S110) is most preferably performed at the temperature of 600° C. for two hours to three hours.

In this case, for the ashing step, an ashing furnace is used. In detail, the dried food waste residue is subject to calcination into the atmosphere at the temperature of 300° C. to 600° C., preferably, 600° C. for the time of two hours to three hours. Then, the dried food waste residue is cooled to the normal temperature.

If the ashing temperature is less than 300° C., the ashing may not be preferably performed. If the ashing temperature exceeds 600° C., the dried food waste residue may be burnt.

Extracting Sample with Solvent

The step (S120) of extracting the sample with solvent is a step of applying alcohol to the food waste residue that has been cooled after the calcination, and stirring the result for at least 10 min.

In this case, an amount of the applied alcohol (unit: L) is preferably five times to 10 times an amount of the food waste residues (unit: g).

If the amount of the alcohol is less than 5 times the amount of the food waste residues, an amount of the food waste residues extracted with the alcohol serving as solvent is reduced. If the amount of the alcohol exceeds 10 times the amount of the food waste residues, a great amount of alcohol may be unnecessarily wasted.

In detail, 1 L to 2 L of alcohol after the calcination is preferably applied to 200 g of the food waste residues dried before the calcination.

The stirring is preferably performed for at least 10 min. so that the food waste residues subject to the calcination is sufficiently stirred. When taking into consideration energy consumption, the stirring is preferably performed for at most 30 min.

The solvent may include one of water, alcohol, ethanol, and ether. As described above, the solvent is preferably alcohol.

The solvents for extraction may include water having polarity and non-polar ether. According to the exemplary embodiment of the present invention, all of the solvents may be used when preparing the C-DOTs according to the exemplary embodiment of the present invention.

However, among the solvents, alcohol can be easily purchased, and has both of polarity and non-polarity characteristics. Accordingly, since the greatest amount of C-DOTs can be obtained when the alcohol is used as a solvent, the alcohol is preferably used as the solvent.

Filtering

The filtering step (S130) includes performing vacuum filtering with respect to the food waste residues, which are stirred together with the solvent, using a filter paper, and performing filtering using a membrane filter.

Since the vacuum filtering using the filter paper is well known to those skilled in the art, the details thereof will be omitted.

Next, in the filtering using the membrane filter, the membrane filter having the pore size of 0.22 μm was used. Although the membrane filter may have a pore size smaller than that of 0.22 μm, the use of the membrane filter having the pore size of at least 0.22 μm is not preferred.

Checking Luminescence

The luminescence checking step (S140) is a step of checking whether the filtrate of the food waste residue filtered using the membrane filter emits light using a UV lamp (having the wavelength of 324 nm).

Figure 2:
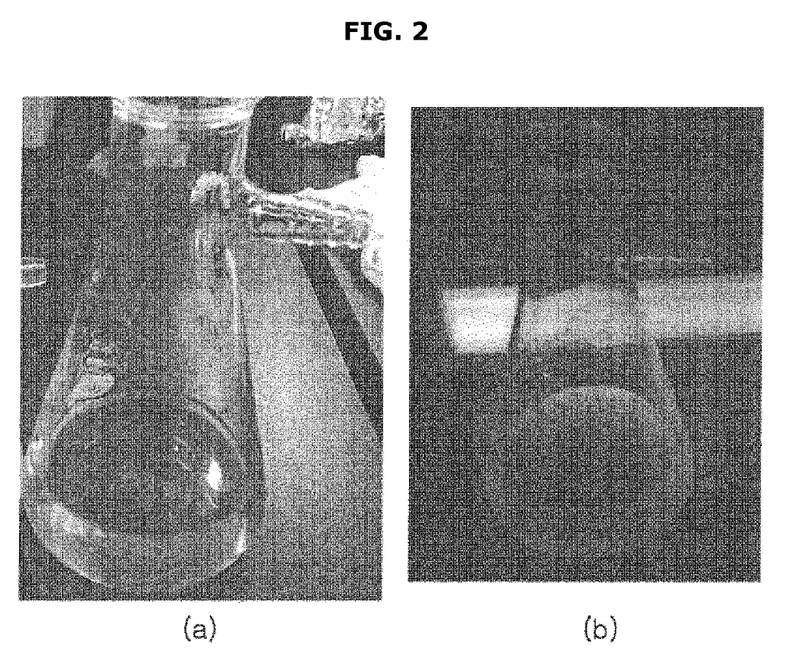
FIG. 2(a) is a photograph showing the experimental result under visible light.
FIG. 2(b) is a photograph showing the experimental result under UV (having the wavelength of 324 nm).

The details of the luminescence checking step will be described later with reference to FIG. 2.

Concentrating

The concentrating step (S150) is a step of concentrating the filtrate using a rotary evaporator (model name: R1110, manufacturer: Eyela, and manufacturing nation: Japan).

According to the concentrating step (S150), in order to solidify the liquid-phase C-DOTs existing in the filtrate, all remaining solvent in the filtrate is preferably removed.

Dissolving in Water

The step (S160) of dissolving the sample in water is a step of dissolving the concentrated and solidified sample by adding water, preferably, distilled water to the concentrated and solidified sample.

The dissolving the sample in the water is performed to freeze-dry the concentrated and solidified sample in the subsequent freeze-drying step.

Those skilled in the art can recognize that a vacuum pump for freeze-drying may has a problem if solvents other than water are used in the freeze-drying, and thus can understand that the use of the solvents other than the water may be restricted for the freeze-drying to be described later.

Freeze-Drying

The step (S170) of freeze-drying the sample is a step of synthesizing powder-phase carbon nanodots after removing moisture from the sample using a freeze-drying device.

In the present freeze-drying step, the most preferable freeze-drying condition may be made when the temperature is −45° C. or less, and the vacuum pressure is 19 Pa or less.

In the final stage, preferably, it is checked whether the C-DOTs subject to the freeze-drying step emit light by using the UV lamp (having the wavelength of 324 nm).

The details of the checking of luminescence from the C-DOTs will be described with reference to FIGS. 3 and 4.

FIGS. 2(a) and (b) are photographs showing an actual fluorescence experimental result of the filtrate of the photoluminescent carbon nanodots according to the exemplary embodiment of the present invention. FIG. 2(a) is a photograph showing the experimental result under visible light, and FIG. 2(b) is a photograph showing the experimental result under UV (having the wavelength of 324 nm).

It can be recognized from FIG. 2(a) that the photoluminescent carbon nanodots represents only yellow color under the visible light.

On the contrary, it can be recognized from FIG. 2(b) that the filtrate of the carbon nanodots represents a clear fluorescence color under the UV lamp (having the wavelength of 324 nm).

Figure 3:
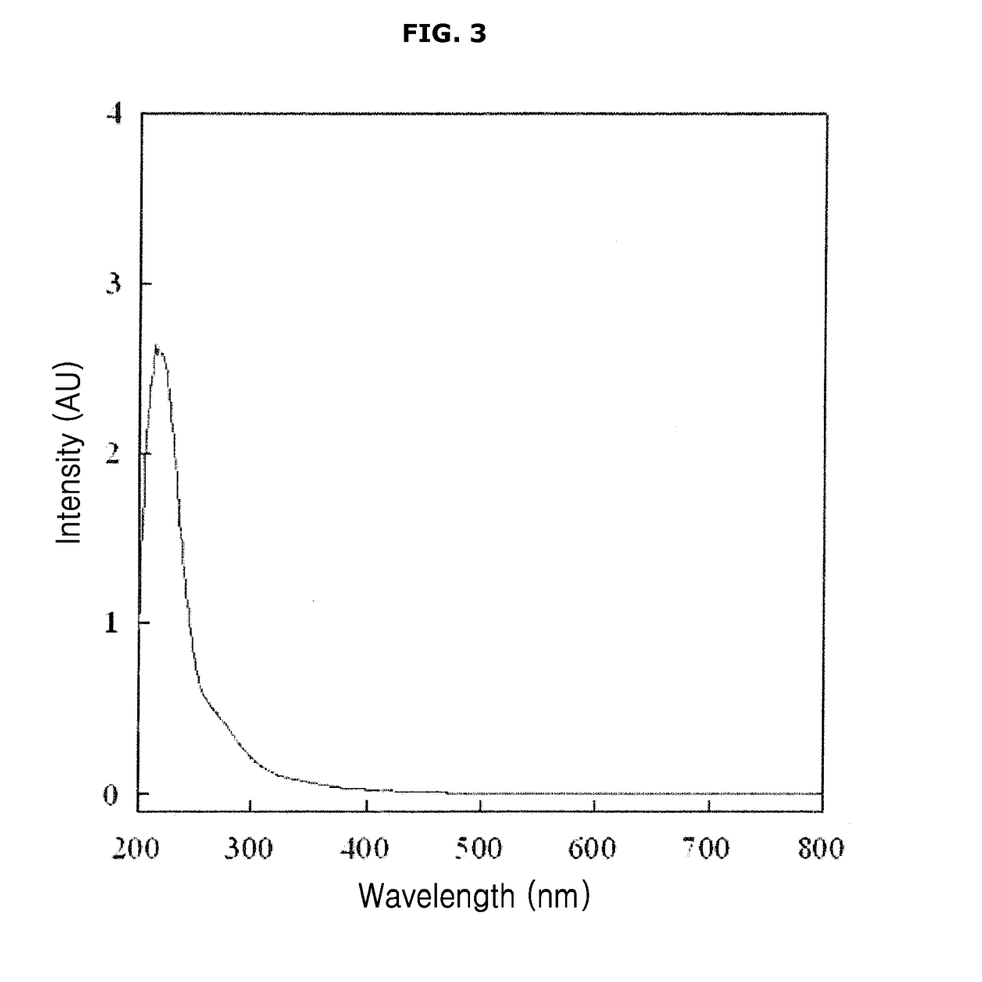
FIG. 3 is a graph showing a light absorption experimental result of the photoluminescent carbon nanodots, which is obtained according to the exemplary embodiment of the present invention.

FIG. 3 is a graph showing a light absorption experimental result of the photoluminescent carbon nanodots, which is obtained according to the exemplary embodiment of the present invention.

It can be recognized from FIG. 3 that the light absorption characteristic of the carbon nanodots is represented at the wavelength band of 200 nm to 800 nm. Specifically, the carbon nanodots absorb light at the wavelength band of 200 nm to 250 nm.

When comparing with the conventional C-DOTs, the C-DOTs according to the present invention absorb light at the lower wavelength.

Figure 4:
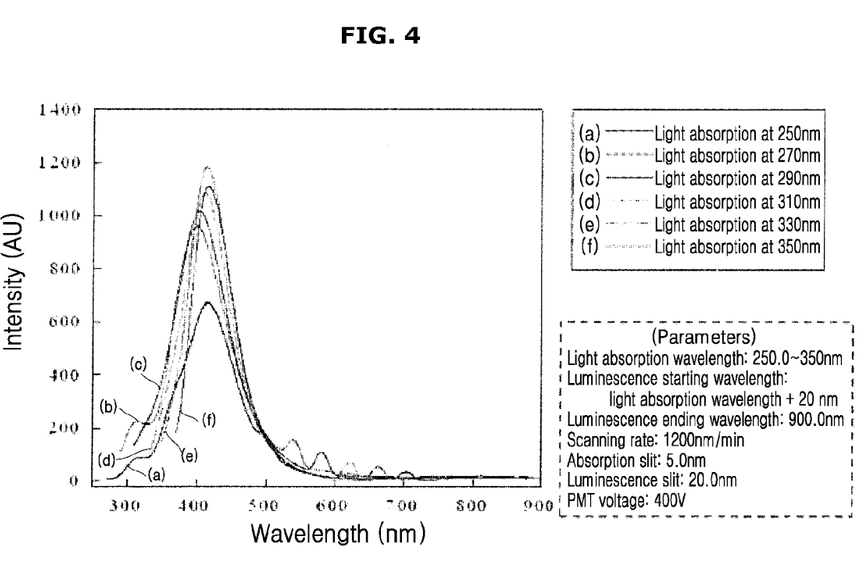
FIG. 4 is a graph showing a photoluminescent reaction experiment at various excitation wavelengths of the photoluminescent carbon nanodots obtained from a general food waste according to the exemplary embodiment of the present invention.

FIG. 4 is a graph showing a photoluminescent reaction experiment at various excitation wavelengths of the photoluminescent carbon nanodots obtained from a general food waste according to the exemplary embodiment of the present invention.

It can be recognized from FIG. 4 that the photoluminescent carbon nanodots obtained from the general food waste residue according to the exemplary embodiment of the present invention can emit light at various wavelengths according to light absorption wavelengths. Accordingly, this indicates that materials having various structures exist in the photoluminescent carbon nanodots obtained from the general food waste residue according the exemplary embodiment of the present invention. However, the details thereof will be omitted because the details are out of the scope of the present invention.

Figure 5:
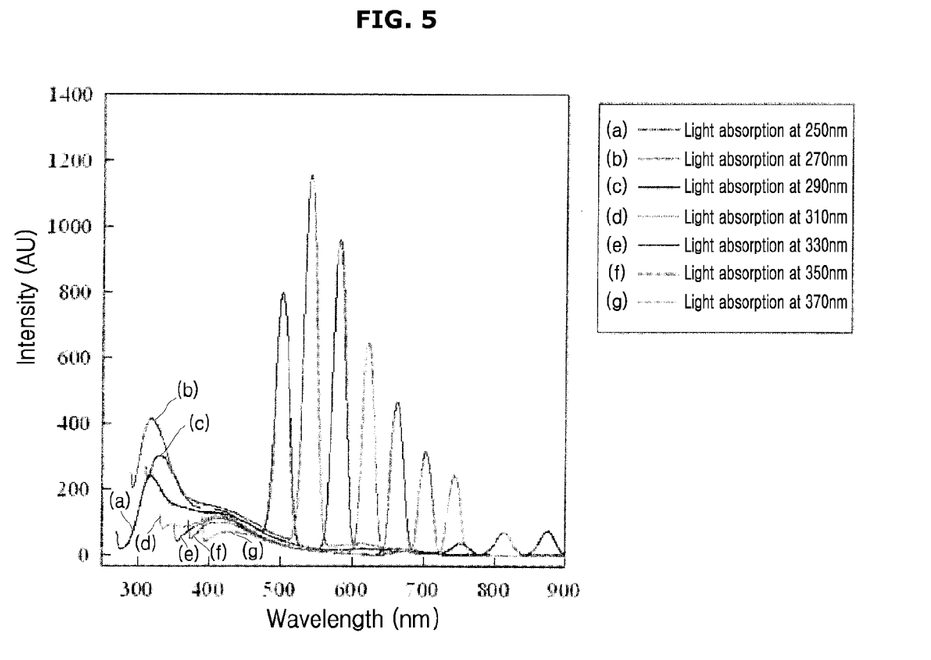
FIG. 5 is a graph showing a photoluminescent reaction experimental result at various exciting wavelengths of the photoluminescent carbon nanodots obtained from animal excrement according to another embodiment of the present invention.

FIG. 5 is a graph showing a photoluminescent reaction experimental result at various exciting wavelengths of the photoluminescent carbon nanodots obtained from animal excrement according to another embodiment of the present invention.

Although the animal excrement employed in the experiment of FIG. 5 shows a characteristic slightly different from that of the photoluminescent carbon nanodots obtained from the general food waste, the photoluminescent carbon nanodots are obtained from the animal excrement and general food waste in the same manner.

The experimental result of FIG. 5 is obtained by performing the experiment at an interval of 20 nm in the light absorption wavelength band of 250 nm to 350 nm. In this case, it can be recognized that the strongest light can be emitted at the wavelength of about 430 nm.

Differently from the experimental result of FIG. 4, although various light absorption wavelengths are shown in FIG. 5, the light emission wavelengths are approximately equal to about 430 nm.

Therefore, when the light emission is required at about 430 nm, the photoluminescent carbon nanodots obtained from the animal excrement according to another exemplary embodiment of the present invention may be used.

Although the detailed embodiment of the present invention has been described, various modifications are possible without departing from the scope of the present invention. Accordingly, the scope of the present invention should be not limited to the described embodiment, but defined within the scope of the appended claims and the equivalents thereof.

Although embodiments have been described with reference to the limited embodiments and the accompanying drawings, it should be understood that numerous other modifications and embodiments could be devised by those skilled in the art that will fall within the spirit and scope of the principles of this disclosure. More particularly, various variations and modifications are possible in the component parts and/or arrangements of the subject combination arrangement within the scope of the disclosure, the drawings, and the appended claims.

INDUSTRIAL APPLICABILITY

As described above, according to the exemplary embodiment of the present invention, the photoluminescent carbon nanodots, which represents biological safety and excellent light emission stability, and has an economical advantage, can be provided.

The invention claimed is:

1. A method for preparing photoluminescent carbon nanodots, the method comprising:
   preparing and drying a sample;
   ashing the sample;
   stirring the ashed sample while extracting the ashed sample with solvent;
   filtering the extracted sample;
   concentrating the filtered sample;
   dissolving the sample in water; and
   freeze-drying the dissolved sample.

2. The method of claim 1, wherein the sample is a food waste residue or animal excrement.

3. The method of claim 1, wherein the drying of the sample is performed by sunlight.

4. The method of claim 1, wherein the ashing of the sample is performed at a temperature in a range of 300° C. to 600° C. for two hours to three hours.

5. The method of claim 1, wherein the stirring of the ashed sample is performed for 10 min. to 30 min.

6. The method of claim 1, wherein the filtering of the sample is performed through vacuum filtration using a filter paper.

7. The method of claim 6, further comprising performing a filtering operation using a membrane filter.

8. The method of claim 7, wherein the membrane filter has a pore size of 0.22 μm.

9. The method of claim 1, wherein the solvent is one of water, alcohol, ethanol, and ether.

* * * * *